United States Patent
Matsumoto et al.

(10) Patent No.: US 10,557,363 B2
(45) Date of Patent: Feb. 11, 2020

(54) SEALING STRUCTURE AND ROTARY MACHINE

(71) Applicant: MITSUBISHI HITACHI POWER SYSTEMS, LTD., Kanagawa (JP)

(72) Inventors: Kazuyuki Matsumoto, Tokyo (JP); Yoshihiro Kuwamura, Tokyo (JP); Hiroharu Oyama, Kanagawa (JP); Yoshinori Tanaka, Kanagawa (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 451 days.

(21) Appl. No.: 15/111,422

(22) PCT Filed: Feb. 23, 2015

(86) PCT No.: PCT/JP2015/055029
§ 371 (c)(1),
(2) Date: Jul. 13, 2016

(87) PCT Pub. No.: WO2015/133313
PCT Pub. Date: Sep. 11, 2015

(65) Prior Publication Data
US 2016/0333714 A1    Nov. 17, 2016

(30) Foreign Application Priority Data
Mar. 4, 2014  (JP) .................................. 2014-042142

(51) Int. Cl.
*F01D 11/08*   (2006.01)
*F16J 15/3264*  (2016.01)
(Continued)

(52) U.S. Cl.
CPC ................ *F01D 11/08* (2013.01); *F01D 5/02* (2013.01); *F01D 9/02* (2013.01); *F01D 11/02* (2013.01);
(Continued)

(58) Field of Classification Search
CPC . F01D 11/02; F01D 11/08; F01D 5/02; F01D 9/02; F16J 15/50; F16J 15/3264
See application file for complete search history.

(56) References Cited

U.S. PATENT DOCUMENTS

| 4,545,725 A | 10/1985 | Ikeda et al. |
| 5,639,095 A | 6/1997 | Rhode |

(Continued)

FOREIGN PATENT DOCUMENTS

| CN | 103228871 | 7/2013 |
| JP | 59-134302 | 8/1984 |

(Continued)

OTHER PUBLICATIONS

International Search Report dated Apr. 28, 2015 in International Application No. PCT/JP2015/055029 (with English translation).
(Continued)

*Primary Examiner* — Brian P Wolcott
(74) *Attorney, Agent, or Firm* — Wenderoth, Lind & Ponack, L.L.P.

(57) ABSTRACT

A sealing structure that seals a clearance between an outer peripheral surface of a rotor and an inner peripheral surface of a stator. The sealing structure includes: a plurality of step portions that are provided on a first surface which is one of the outer peripheral surface of the rotor and the inner peripheral surface of the stator so as to be arranged in the axial direction, and that protrude from the first surface toward a second surface which is the other of the outer peripheral surface of the rotor and the inner peripheral surface of the stator; and a seal fin that is provided on the second surface, and that forms a small clearance between a corresponding peripheral surface of the step portions. A portion in the vicinity of a tip of the seal fin in the radial direction is inclined toward the upstream side.

2 Claims, 6 Drawing Sheets

(51) Int. Cl.
  *F01D 11/02* (2006.01)
  *F01D 5/02* (2006.01)
  *F01D 9/02* (2006.01)
  *F01D 5/22* (2006.01)
(52) U.S. Cl.
  CPC ........... *F16J 15/3264* (2013.01); *F01D 5/225* (2013.01); *F05D 2220/31* (2013.01); *F05D 2250/314* (2013.01)

(56) References Cited

U.S. PATENT DOCUMENTS

| | | | |
|---|---|---|---|
| 9,353,640 B2* | 5/2016 | Kuwamura | F01D 11/10 |
| 9,388,701 B2* | 7/2016 | Kuwamura | F01D 5/225 |
| 9,410,432 B2* | 8/2016 | Matsumoto | F01D 5/147 |
| 9,429,022 B2* | 8/2016 | Matsumoto | F01D 5/225 |
| 2009/0072487 A1 | 3/2009 | Chougule et al. | |
| 2012/0288360 A1* | 11/2012 | Kuwamura | F01D 5/225 415/173.1 |
| 2013/0149118 A1* | 6/2013 | Lotfi | F01D 11/02 415/174.5 |
| 2013/0251534 A1 | 9/2013 | Matsumoto et al. | |
| 2013/0272855 A1 | 10/2013 | Kuwamura et al. | |

FOREIGN PATENT DOCUMENTS

| | | |
|---|---|---|
| JP | 2002-228014 | 8/2002 |
| JP | 2011-80452 | 4/2011 |
| JP | 2012-2234 | 1/2012 |
| JP | 2012-72689 | 4/2012 |
| JP | 2013-019537 | 1/2013 |
| JP | 2013-68227 | 4/2013 |
| JP | 2013-199860 | 10/2013 |
| JP | 2013-204269 | 10/2013 |

OTHER PUBLICATIONS

Written Opinion of the International Searching Authority dated Apr. 28, 2015 in International Application No. PCT/JP2015/055029 (with English translation).

Y. Kuwamura et al., "Development of New High-Performance Labyrinth Seal Using Aerodynamic Approach", Proceedings of ASME Turbo Expo 2013, GT2013, GT2013-94106.

Office Action dated Dec. 2, 2016 in corresponding Chinese patent application No. 201580003433.5 (with English translation).

* cited by examiner

SEALING STRUCTURE AND ROTARY MACHINE

BACKGROUND OF THE INVENTION

1. Technical Field

The present invention relates to a sealing structure that seals a space between a rotor and a stator, and a rotary machine provided therewith.

Priority is claimed on Japanese Patent Application No. 2014-042142 filed Mar. 4, 2014, the contents of which are incorporated herein by reference.

2. Description of the Related Art

As it is well known, as a type of steam turbine which is a rotary machine, there is a rotary machine including a casing, a shaft body (rotor) rotatably provided inside the casing, a plurality of vanes which are fixedly disposed on an inner periphery of the casing, and a plurality of blades provided radially on the shaft body at a downstream side of the plurality of vanes. In the case of an impulse turbine among such steam turbines, pressure energy of steam (fluid) is converted to kinetic energy by the vanes, and the kinetic energy is converted into rotational energy (mechanical energy) by the blades. Further, in the case of a reaction turbine, pressure energy is converted to kinetic energy in the blades also, and the kinetic energy is converted to rotational energy (mechanical energy) by the reaction force of the ejection of steam.

In this type of steam turbine, a space in a radial direction is formed between a tip portion of the blades and the casing forming a flow path of the steam by surrounding the blades, and moreover, another space in the radial direction is also formed between the tip portion of the vanes and the shaft body. However, the leakage steam which passes through the space between the tip portion of the blades and the casing to the downstream side does not impart rotational force to the blades. Further, since the pressure energy of the leakage steam which passes through the space between the tip portion of the vanes and the shaft body to the downstream side is not converted to kinetic energy by the vanes, rotational force is hardly imparted to the blades disposed at the downstream side. Therefore, in order to improve the performance of the steam turbine, it is important to reduce a flow amount of the leakage steam (leakage flow rate) passing through the space.

Conventionally, for example, as disclosed in Japanese Unexamined Patent Application, First Publication No. 2011-080452, a turbine was proposed having a structure in which a plurality of step portions whose height gradually increases from an upstream side toward a downstream side in an axial direction are formed at a tip portion of the blades, a plurality of seal fins extending toward each step portion are formed on a casing, and a small clearance is formed between each step portion and the tip of each seal fin.

In this turbine, a main vortex is generated at the upstream side of a stepped surface by the collision of a fluid that entered into the space from the upstream side with the stepped surface of the step portion, and a separation vortex is generated in the downstream side of the stepped surface (in the vicinity of the upstream side of the small clearance). Reduction of leakage flow passing through the small clearance is achieved by the separation vortex generated in the vicinity of the upstream side of the small clearance. That is, the reduction of flow rate of the leakage fluid passing through the space between the tip portion of the blades and the casing is achieved.

SUMMARY OF THE INVENTION

1. Problem to be Solved by the Invention

However, there is a strong demand for improved performance of the steam turbine, and therefore, a further reduction of the leakage flow rate has been demanded.

An object of the present invention is to provide a high-performance sealing structure in which the leakage flow rate is further reduced, in a sealing structure that seals the space between the rotor and the stator, and to provide a rotary machine provided therewith.

2. Means for Solving the Problem

The first aspect of the present invention provides a sealing structure that seals a space between an outer peripheral surface of a rotor rotating around an axis thereof and an inner peripheral surface of a stator disposed so as to surround the rotor from an outer peripheral side thereof in a radial direction of the rotor, the sealing structure includes: a plurality of step portions that are provided on a first surface which is one of the outer peripheral surface of the rotor and the inner peripheral surface of the stator so as to be arranged in an axial direction, each having a stepped surface facing an upstream side in the axial direction of the rotor, and that protrude from the first surface toward a second surface which is the other of the outer peripheral surface of the rotor and the inner peripheral surface of the stator; and a seal fin that is provided on the second surface, that extends toward a peripheral surface of each of the plurality of step portions, and that forms a small clearance between a corresponding peripheral surface of plurality of the step portions, wherein the seal fin includes a bending point provided at a position apart from the second surface in the radial direction toward the first surface by a predetermined distance, and a bending portion which is inclined toward the upstream side from the bending point toward the tip of the seal fin on a first surface side.

According to the above structure, as the same as in the conventional art, a main vortex is generated at the upstream side of the stepped surface by the collision of a fluid that has entered into the space from the upstream side with the stepped surface of each of the step portions. Also, a separation vortex rotating in an opposite direction of the main vortex is generated on a peripheral surface of each of the step portions arranged at the downstream side of the stepped surface, by the separation of part of the flow from the main vortex at a corner portion (edge) formed of the stepped surface and the peripheral surface of each of the step portions. The separation vortex generates a down-flow directed to the peripheral surface of the step portion from a tip of the seal fin, and therefore, the separation vortex exhibits a contraction effect that reduces the fluid passing through the small clearance between the tip of the seal fins and the step portions.

The fluid flowing toward one side from the other side on the seal fins passes through the small clearance while being returned to the upstream side by a slope in the vicinity of the tip of the seal fins, and thereby, the fluid flows so as to bypass the vicinity of the tip of the seal fins. As a result of the flow of this fluid and the separation vortex, the contraction effect is enhanced and the leakage flow rate can be reduced.

In the above sealing structure, when the small clearance is defined as H and a distance between the seal fin and the stepped surface at the upstream side of the step portion in the axial direction is defined as L, the sealing structure may have a structure that satisfies the following expression.

$$1.25 < L/H < 2.75$$

According to such structure, as shown in the simulation results that will hereafter be described, the contraction effect is further enhanced by the separation vortex and the leakage flow rate can be further reduced.

In the above sealing structure, an angle of the seal fin may be continuously varied in the radial direction in a region from the second surface to a predetermined distance from the second surface.

According to such structure, since the flow of the generated main vortex and separation vortex is less likely to be inhibited by the seal fin, the effect of the slope in the vicinity of the tip of seal fin can be further enhanced.

The present invention provides a rotary machine including any of the above-described sealing structures.

3. Effects of the Invention

The present invention, which is provided with a sealing structure that seals a space between an outer peripheral surface of a rotor and an inner peripheral surface of a stator that is disposed so as to surround the rotor from an outer peripheral side thereof in a radial direction, enhances the contraction effect and can reduce the leakage flow rate.

DETAILED DESCRIPTION OF EMBODIMENTS OF THE INVENTION

Hereinafter, a steam turbine which is a rotary machine of an embodiment of the present invention will be explained in detail with reference to the drawings.

Figure 1:
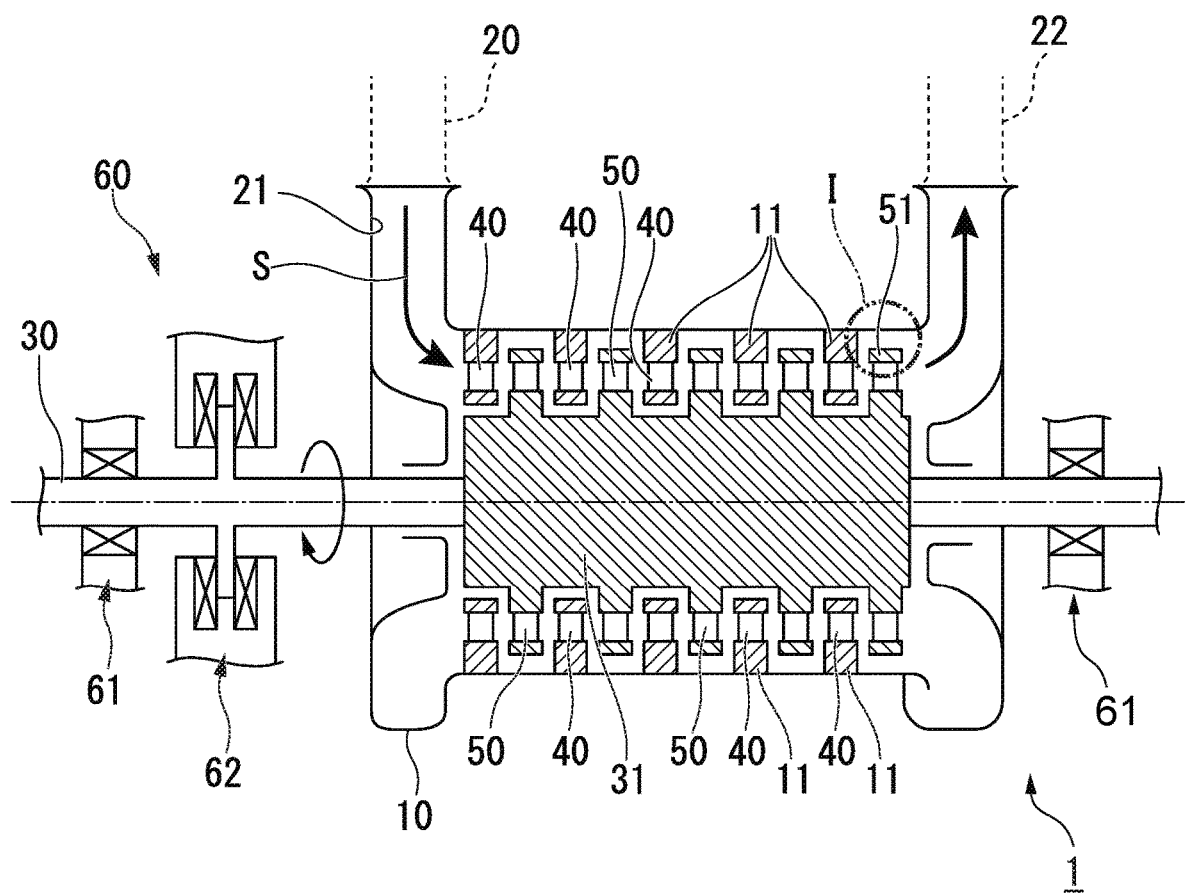
FIG. 1 is a schematic cross-sectional view of a steam turbine of an embodiment of the present invention.

As shown in FIG. 1, a steam turbine 1 of the present embodiment is provided with a casing 10 (a stator), a rotating shaft 30 that is rotatably provided inward of the casing 10 and transmits power to a machine such as a generator (not shown), a vane 40 that is held in the casing 10, a blade 50 that is provided on the rotating shaft 30, and a bearing portion 60 that rotatably supports the rotating shaft 30 about an axis thereof.

Steam S is introduced from a main flow inlet 21 formed in the casing 10 via a steam supply pipe 20 connected to a steam supply source (not shown), and is discharged from a steam discharge pipe 22 connected to a downstream side of the steam turbine 1.

The casing 10 is formed as a flow path of the steam S and an internal space of the casing is hermetically sealed. On an inner wall surface of the casing 10, a partition-plate outer ring 11 which has a ring-shape and into which the rotating shaft 30 is inserted is firmly fixed.

The bearing portion 60 is provided with a journal bearing device 61 and a thrust bearing device 62, and rotatably supports the rotating shaft 30.

The vane 40 extends toward an inner peripheral side from the casing 10, and constitutes an annular vane group in which a plurality of vanes is disposed radially so as to surround the rotating shaft 30. Each of the plurality of vanes 40 are held in the partition-plate outer ring 11.

A plurality of annular vane groups including the plurality of vanes 40 is formed at intervals in the axial direction of the rotating shaft 30 (hereinafter, simply referred to as "axial direction"). The plurality of vanes 40 converts pressure energy of the steam into kinetic energy and is configure to allow the steam to flow into the blade 50 disposed adjacent in the downstream side thereof.

The blade 50 is rigidly attached on an outer peripheral portion of the rotating-shaft main body 31 of the rotating shaft 30, and constitutes an annular blade group in which a plurality of blades are disposed radially at the downstream side of each annular vane group.

These annular vane group and annular blade group are one set per one stage. A tip portion of the blade 50 at the final stage among the stages is connected to a tip portion of the blade 50 adjacent in a peripheral direction of the rotating shaft 30 (hereinafter, simply referred to as "peripheral direction"), and is called a shroud 51 (rotor).

Figure 2:
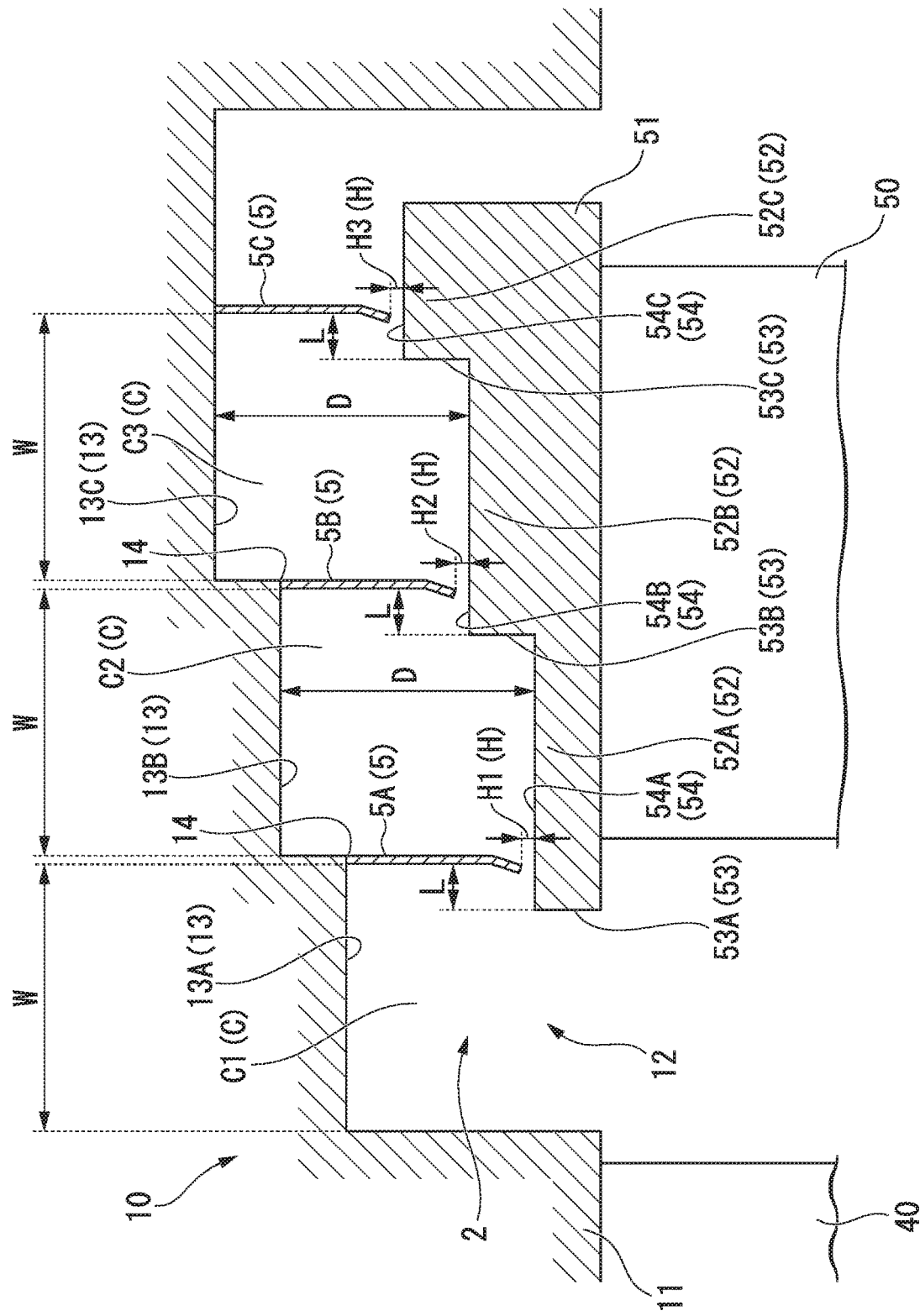
FIG. 2 is a view of the embodiment of the present invention and is an enlarged cross-sectional view showing a main part I of FIG. 1.

As shown in FIG. 2, the shroud 51 that forms the tip portion of the blade 50 is disposed so as to face the casing with a space in a radial direction between the partition-plate outer ring 11 of the casing 10 being interposed. Also, a sealing structure 2 is provided between the shroud 51 and the partition-plate outer ring 11 of the casing 10. Hereinafter, the components of the sealing structure 2 will be described in detail.

The shroud 51 includes three step portions 52 (52A to 52C), each of which has a stepped surface 53 (53A to 53C), and which protrude toward the partition-plate outer ring 11 side, and the three step portions are arranged in the axial direction.

The protrusion height of the three step portions 52A to 52C from the blade 50 to an outer peripheral surface (peripheral surface) 54A to 54C (54) of the three step portions 52A to 52C is formed so as to gradually increase toward the downstream side from the upstream side in the axial direction. Accordingly, the stepped surface 53 of each of the step portions 52 faces the upstream side in the axial direction. Also, in the present embodiment, the stepped surface 53 of each of the step portions 52 is parallel to the radial direction, and the three stepped surfaces 53A to 53C are set to have the same height. Moreover, in the present embodiment, the outer peripheral surface 54 of each of the step portions 52 is parallel to the axial direction.

In the partition-plate outer ring 11, an annular groove 12 extending in the peripheral direction is formed in a portion corresponding to the shroud 51. In the present embodiment, the annular groove 12 is formed to be dented radially outside from an inner peripheral surface of the partition-plate outer ring 11. The shroud 51 is disposed so as to enter into the annular groove 12.

A bottom portion of the annular groove 12 facing radially inward so as to face the three step portions 52A to 52C has three annular recesses 13 (13A to 13C, the inner peripheral surface) formed so as to be arranged in the axial direction. The three annular recesses 13A to 13C are formed so as to be gradually enlarged radially by the steps from the upstream side to the downstream side.

Seal fins 5 (5A to 5C) extending radially inward toward the shroud 51 are provided on each of casing-side edge portions 14 positioned at a boundary of two annular recesses 13, 13 adjacent to each other in the axial direction. An axial position of the casing-side edge portions 14 and seal fins 5 is set so as to face the outer peripheral surface 54 of each of the step portions 52. Specifically, the three seal fins 5A to 5C are arranged at intervals in the axial direction and are provided so as to correspond one-to-one with the three step portions 52A to 52C. In the present embodiment, the three seal fins 5A to 5C are arranged at equal intervals in the axial direction.

A small clearance H (H1 to H3) in the radial direction is defined between the outer peripheral surface 54 of each of the step portions 52 and the tip of each of the seal fins 5. Each dimension of the small clearance H is set to be minimum in consideration of an amount of thermal expansion of the casing 10 and the blade 50, an amount of centrifugal expansion of the blade 50, and the like, and in a safe range in which the casing and the blade do not contact. In the present embodiment, the size of the three small clearances H1 to H3 is set to be the same.

Three cavities C (C1 to C3) are formed between the shroud 51 and the partition-plate outer ring 11 so as to be arranged in the axial direction by the sealing fins 5 being provided. Each of the cavities C is formed between the seal fin 5 corresponding to each of the step portions 52 and a partition wall facing the upstream side in the axial direction with respect to the seal fin 5.

In addition, as will be described later, a ratio D/W of a radial size D to an axial size W of each cavity C (vertical to horizontal ratio D/W of the cavity) is preferred to be set to be close to 1.0 so that a size of the separation vortex SV generated in the same cavity C becomes smaller than that of a main vortex MV (see FIG. 4).

Figure 3:
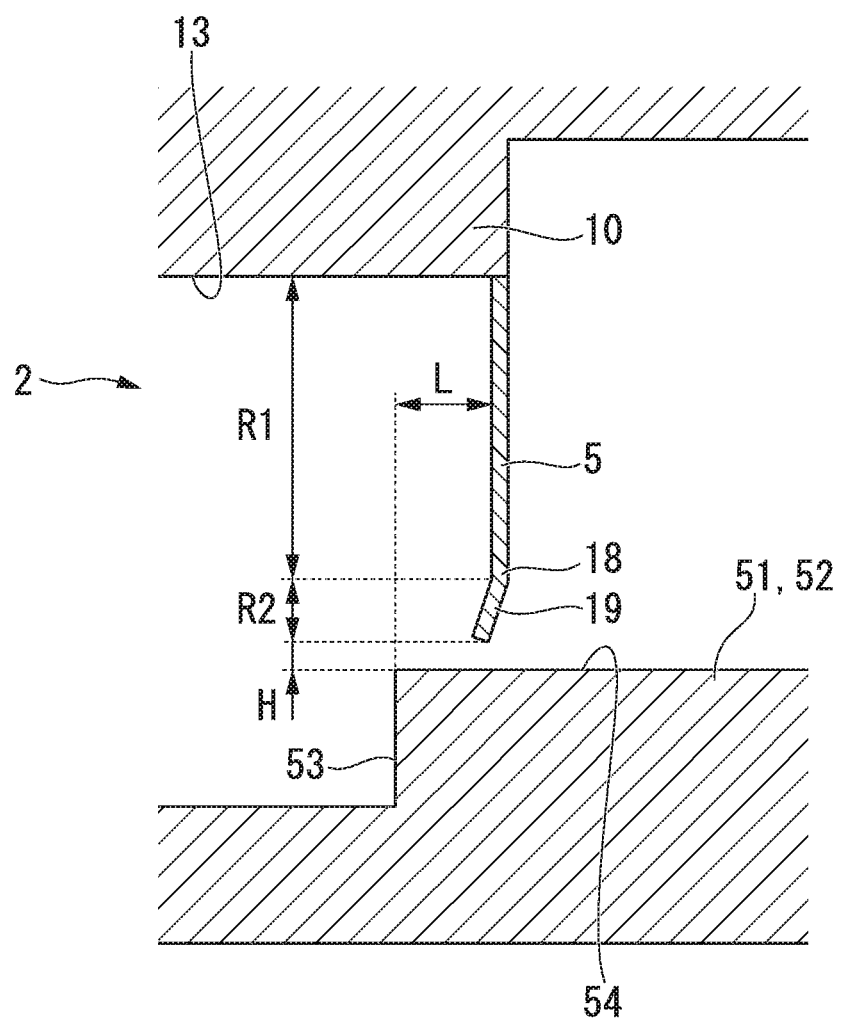
FIG. 3 is a view of the embodiment of the present invention and is an enlarged cross-sectional view showing a seal fin of FIG. 2.

As shown in FIG. 3, a portion in the vicinity of a tip of the seal fin 5 of the present embodiment in the radial direction, which is positioned at the shroud 51 side beyond a region R1 from the annular recess 13 to a predetermined distance therefrom, is inclined toward the upstream side. In other words, the seal fin 5 of the present embodiment at only the vicinity of the tip of the seal fin 5 is partially bent, and a bent portion 19 which is inclined to the upstream side is formed in the vicinity of the tip portion.

When a distance between the seal fin 5 and the stepped surface 53 at the upstream side in the axial direction of the step portion 52 that corresponds thereto (a length of the outer peripheral surface 54 of each of the step portions 52 from each of the small clearances H to the stepped surface 53 at the upstream side) is defined as L, at least one of the distance L is formed so as to satisfy the following expression (1).

$$1.25 < L/H < 2.75 \quad (1)$$

That is, the distance L is set to substantially twice the size of the small clearance H.

The angle of the entire seal fin 5 is continuously varied in the radial direction in the region R1 from the annular recess 13 to the predetermined distance therefrom. That is, a protrusion is not formed on the sealing fin 5 in the region R1 in the radial direction of the seal fin 5.

Here, the operation of the steam turbine 1 having the above structure will be described.

First, the steam S flows into the internal space of the casing 10 from the steam supply source such as a boiler (not shown) via the steam supply pipe 20.

The steam S that has flowed into the internal space of the casing 10 sequentially passes through the annular vane group and annular blade group in each stage. At this time, the pressure energy is converted to kinetic energy by the vanes 40, the majority of the steam S passed through the vanes 40 flows between the blades 50 constituting the same stage, the kinetic energy and pressure energy of the steam S is converted to a rotational energy by the blades 50, and rotation is imparted to the rotating shaft 30. On the other hand, part of the steam S (e.g., a few percent) flows into the annular groove 12 (a space between the shroud 51 of the blades 50 and the partition-plate outer ring 11 of the casing 10) after flowing out from the vanes 40; and this becomes, so-called, leakage steam.

Figure 4:
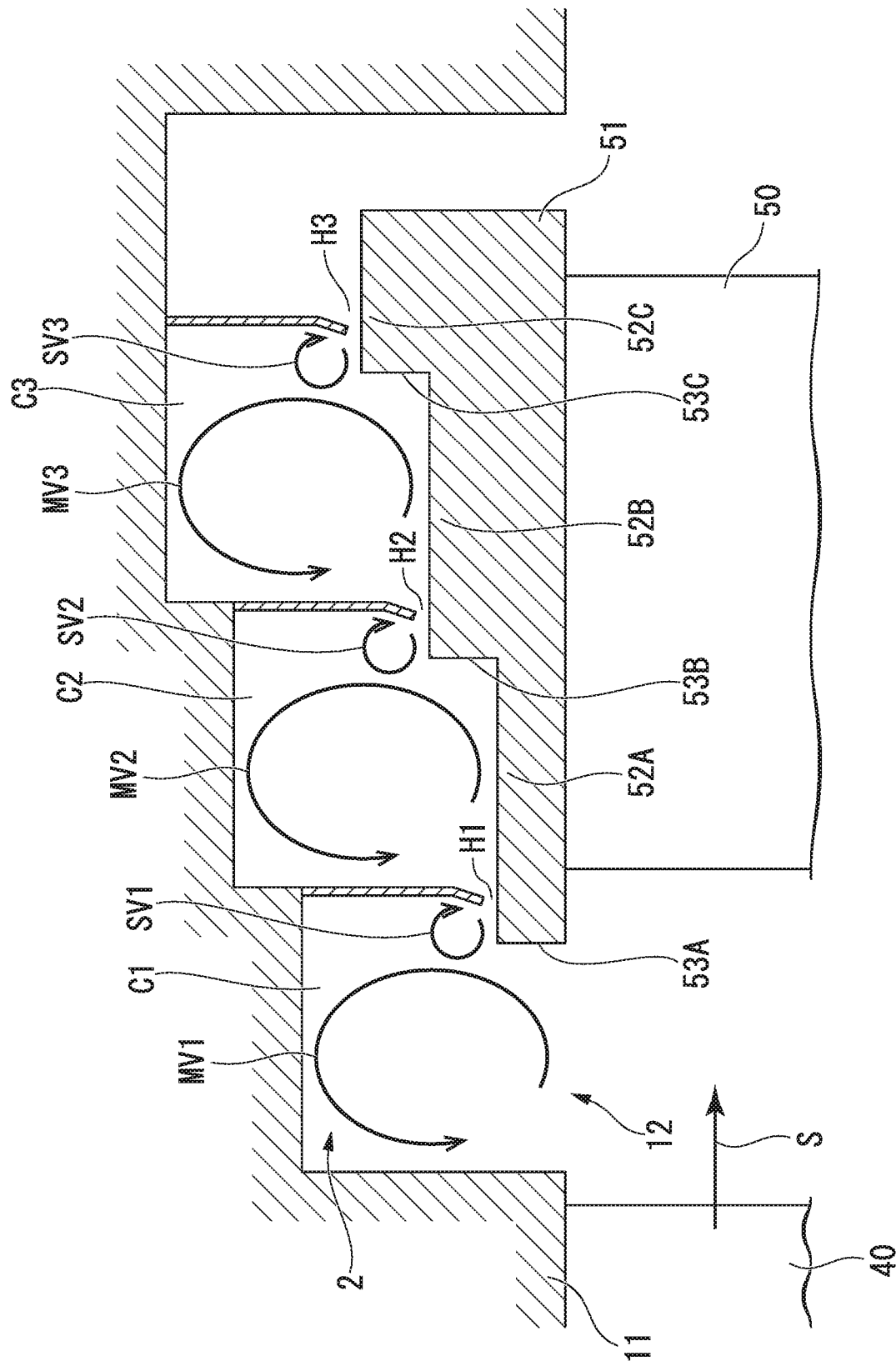
FIG. 4 is an operation explanatory diagram of the steam turbine of an embodiment of the present invention.

As shown in FIG. 4, the steam S that has flowed into the annular groove 12, first, collides with the stepped surface 53A of the step portion 52A of the first stage along with flowing into a first cavity C1, and flows so as to return to the upstream side. As a result, in the first cavity C1, a main vortex MV1 rotating in a counter-clockwise direction (first rotation direction) is generated.

At that time, since part of the flow is separated from the main vortex MV1 particularly at the corner portion (edge) formed of the stepped surface 53A of the step portion 52A of the first stage and the outer peripheral surface 54A, a separation vortex SV1 rotating in a clockwise direction (the second rotation direction) that is an opposite direction to the main vortex MV1 is generated on the outer peripheral surface 54A of the step portion 52A of the first stage.

The separation vortex SV1 is positioned in the vicinity of the upstream side of the first small clearance H1 which is disposed between the step portion 52A of the first stage and the seal fin 5A. In particular, since a down-flow of the separation vortex SV1 directed to the radially inner side is generated just before the first small clearance H1, the contraction effect that reduces the leakage flow entering into the second cavity C2, which is disposed at the downstream side, from the first cavity C1 through the first small clearance H1 can be obtained by the separation vortex SV1.

When the steam S flows into the second cavity C2 from the first cavity C1 after passing through the first small clearance H1, a main vortex MV2 is generated in the second cavity C2 as the same in the case of the first cavity C1, and a separation vortex SV2 is generated as well.

Further, when the steam S flows into the third cavity C3 after passing through a second small clearance H2, as the same in the case of the first and second cavities C1, C2, a main vortex MV3 is generated in the third cavity C3, and a separation vortex SV3 is generated, too.

Figure 5A:
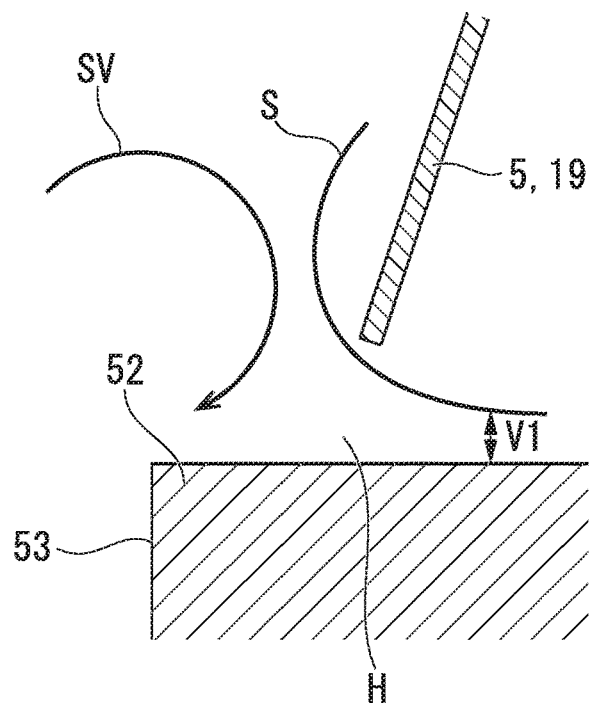
FIG. 5A is a view explaining behavior of steam flowing through a small clearance, and is a view explaining behavior of steam at the seal fin of the embodiment of the present invention.

As shown in FIG. 5A, the steam S that flows toward the radially inner peripheral side from the radially outer peripheral side on the sealing fins 5 passes through the small clearance H while being returned to the upstream side by the slope of the bent portion 19 disposed in the vicinity of the tip of the seal fins, and thereby, the steam S flows so as to bypass the vicinity of the tip of the seal fins 5. The flow of the steam S and the separation vortex SV enhance the contraction effect and the pseudo space V1 is reduced; and therefore, the leakage flow rate can be reduced.

Figure 5B:
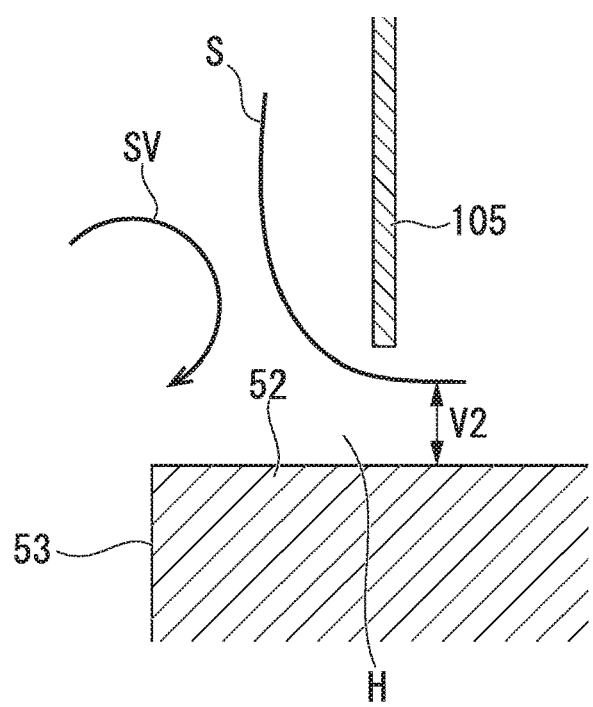
FIG. 5B is a view explaining behavior of steam flowing through a small clearance, and is a view explaining behavior of steam at the seal fin that does not have a slope as in the conventional art.

On the other hand, as shown in FIG. 5B, in the case of seal fins 105 without a slope as in the conventional art, a bypass amount of steam S that flows toward the radially inner peripheral side from the radially outer peripheral side on the seal fins 105 is small; and therefore, a pseudo space V2 is large as compared with the seal fins 5 of the present embodiment, and the leakage flow rate is greater than that in the sealing structure of the present embodiment.

According to the above embodiment, the steam S that flows to the downstream side from the upstream side on the sealing fins 5 passes through the small clearance H while being returned to the upstream side by the slope of the vicinity of the tip of the seal fins 5. As a result, the steam S flows so as to bypass the vicinity of the tip of the seal fins 5. The flow of the steam S and the separation vortex SV enhance the contraction effect, and the leakage flow rate can be reduced.

Also, when the small clearance is defined as H and the distance between the seal fin 5 and the stepped surface 53 at the upstream side of the step portion 52 in the axial direction is defined as L, the expression L/H is set so as to satisfy $1.25 < L/H < 2.75$. Thus, as shown in the simulation results that will be described later, the contraction effect of the separation vortex SV is further enhanced, and the leakage flow rate can be further reduced.

Since the angle of the entire seal fin 5 is continuously varied in the radial direction in the region R1 from the annular recess 13 to the predetermined distance therefrom, the flow of the generated main vortex MV and separation vortex SV is less likely to be inhibited by the seal fin 5. Accordingly, the effect of the slope in the vicinity of the tip of seal fin 5 can be further enhanced.

Figure 6:
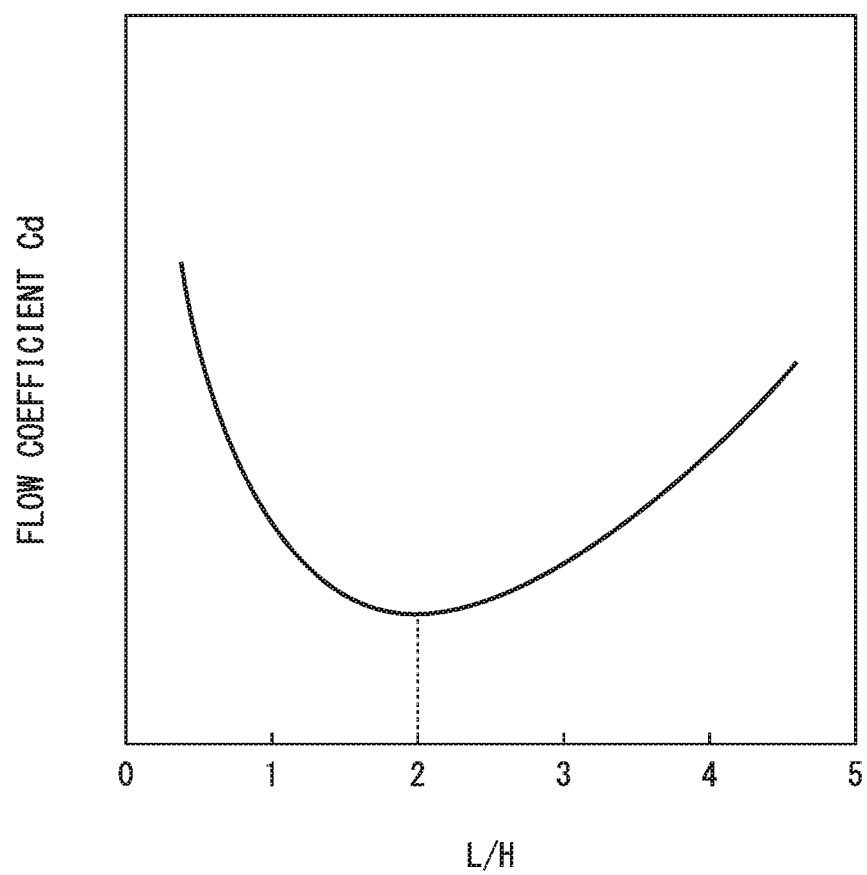
FIG. 6 is a graph showing a relationship between a horizontal to vertical ratio L/H of a distance L to the small clearance H and flow coefficient Cd of steam passing through the small clearance H.

Incidentally, as shown in FIG. 6, the above effect is apparent from the results of the experiments conducted by the inventors.

The graph shown in FIG. 6 is a result of experiments with respect to a relationship between a horizontal to vertical ratio L/H in the step portion 52 and the flow coefficient Cd of the steam S passing through the corresponding small clearance H. The graph indicates that the smaller the flow rate coefficient Cd is, the smaller the flow rate of the steam S passing through the small clearance H is.

According to this graph, it can be seen that the optimum value of the horizontal to vertical ratio L/H in which the flow coefficient Cd becomes minimum is present in the small clearance H. The optimum value of the horizontal to vertical ratio L/H in the small clearance H is 2.0.

According to the above, the present invention was described in detail; however, the present invention is not limited to the above-described embodiment, and various modifications can be made without departing from the scope of the present invention.

DESCRIPTION OF REFERENCE SIGNS

1: Steam turbine
2: Sealing structure
5 (5A to 5C) Seal fin
10: Casing (Stator)
11: Partition-plate outer ring
12: Annular groove
13 (13A to 13C): Annular recess (Inner peripheral surface)
14: Edge portion
18: Bending point
19: Bending portion
20: Steam supply pipe
21: Main flow inlet
22: Steam discharge pipe
30: Rotating shaft
31: Rotating-shaft main body
40: Vane
50: Blade
51: Shroud (Rotor)
52 (52A to 52C): Step portion
53 (53 to 53C): Stepped surface
54 (54A to 54C): Outer peripheral surface
60: Bearing portion
61: Journal bearing device
62: Thrust bearing device
C (C1 to C3): Cavity
D: Size in radial direction
H (H1 to H3): Small clearance
L: Distance
MV: Main vortex S: Steam SV: Separation vortex W: Size in axial direction

The invention claimed is:

1. A sealing structure configured to seal a space between an outer peripheral surface of a rotor, the rotor being configured to rotate around an axis of the rotor and an inner peripheral surface of a stator surrounding the rotor from an outer peripheral side of the rotor in a radial direction, the sealing structure comprising:
a plurality of step portions on a first surface which is one of the outer peripheral surface of the rotor and the inner peripheral surface of the stator, the plurality of step portions being arranged in an axial direction, each of the plurality of step portions having a stepped surface which faces an upstream side in the axial direction, and protrudes from the first surface toward a second surface which is the other of the outer peripheral surface of the rotor and the inner peripheral surface of the stator; and
a plurality of seal fins on the second surface, each of the plurality of seal fins extending toward a peripheral surface of a corresponding one of the plurality of step portions such that a clearance is defined between each of the plurality of seal fins and the peripheral surface of the corresponding one of the plurality of step portions,
wherein each of the plurality of seal fins includes a tip, a bent point at a position apart from the second surface in the radial direction toward the first surface by a predetermined distance, and a bent portion which is inclined toward the upstream side from the bent point toward the tip on a first surface side,
wherein a cavity is defined between each adjacent pair of the plurality of seal fins and a cavity is defined between one of the plurality of seal fins which is furthest upstream and a side surface of one of the stator and the rotor, the side surface facing toward a downstream side, and
wherein a vertical to horizontal ratio D/W, which is a ratio of a radial size D of each cavity to an axial size W of each cavity, is 1.0.

2. A rotary machine comprising the sealing structure according to claim 1.

* * * * *